F. W. ROLLER.
ELECTRICAL MEASURING INSTRUMENT.
APPLICATION FILED DEC. 15, 1914.
1,312,753.
Patented Aug. 12, 1919.
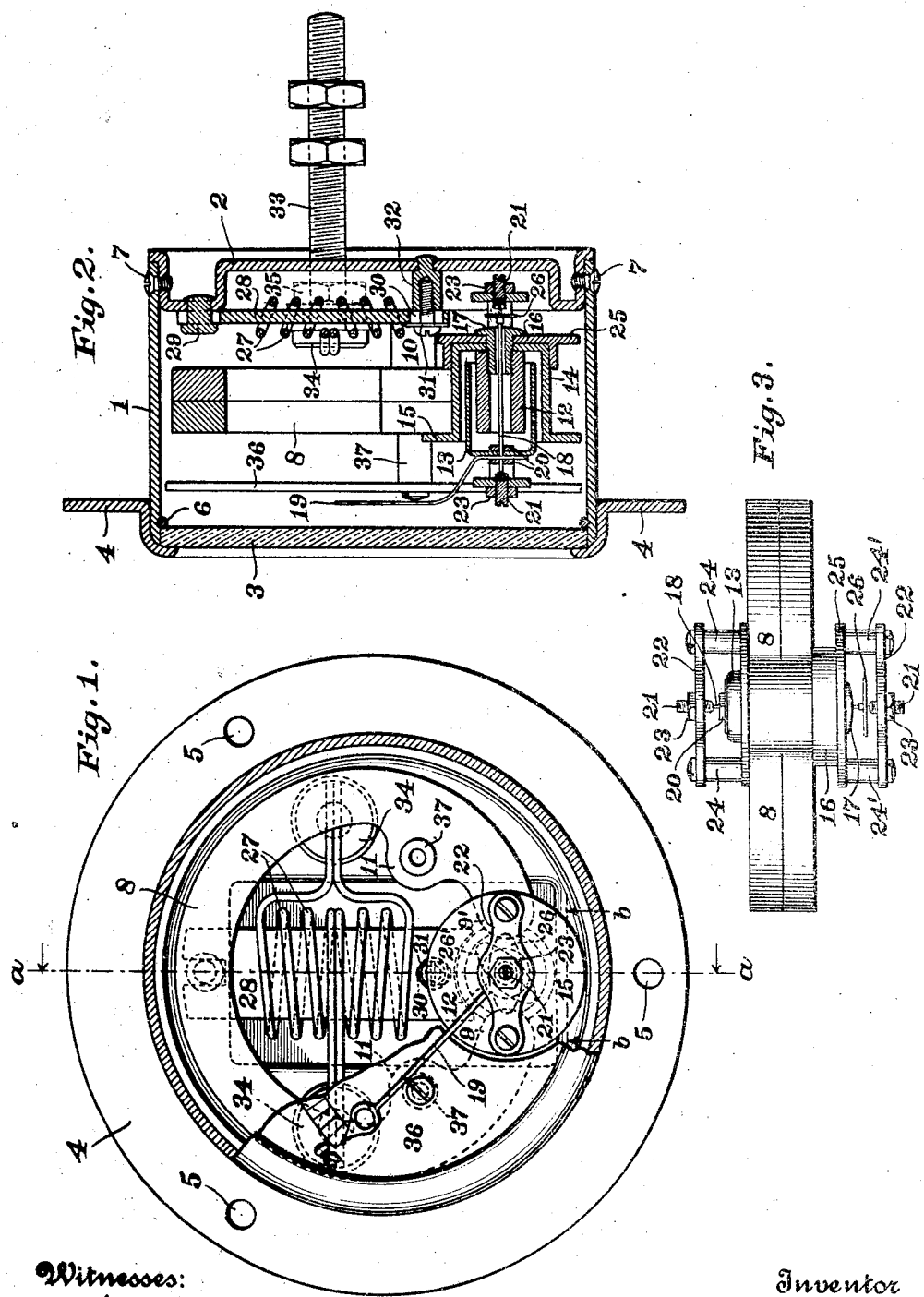

UNITED STATES PATENT OFFICE.

FRANK W. ROLLER, OF EAST ORANGE, NEW JERSEY, ASSIGNOR TO ROLLER-SMITH COMPANY, A CORPORATION OF NEW YORK.

ELECTRICAL MEASURING INSTRUMENT.

1,312,753.    Specification of Letters Patent.    Patented Aug. 12, 1919.

Application filed December 15, 1914. Serial No. 877,282.

*To all whom it may concern:*

Be it known that I, FRANK W. ROLLER, a citizen of the United States, residing at East Orange, in the county of Essex and State of New Jersey, have invented certain new and useful Improvements in Electrical Measuring Instruments, of which the following is a full, clear, and exact specification.

This invention relates to electrical measuring instruments and particularly to that type of instrument adapted to measurement of current strength or potential of a direct current circuit. My invention is particularly well adapted for use upon automobiles having electric starting or lighting systems.

The main objects of my invention are to provide an instrument which shall be of a simplified form of construction, a small number of parts, a high degree of durability, a relatively large capacity, a compact construction and convenient accessibility and have its indications well damped. Other objects and advantages of my invention will be understood from the following description and accompanying drawings.

Figure 1 is a plan view of one form of instrument embodying my invention, certain parts being broken away and shown in section for showing the interior construction.

Fig. 2 is a vertical section in the line *a—a* of Fig. 1, and Fig. 3 is a front elevation of certain of the parts on the line *b—b* of Fig. 1.

The instrument is provided with a cylinder 1 forming part of the casing and a base portion 2 which closes one end of the cylinder. The opposite end of the cylinder is closed by a glass plate 3. Secured to the cylinder 1 is a supporting ring or flange 4 having holes 5 for supporting the instrument against any suitable board or plate such as the dash-board of an automobile. The ring 4 extends over the edge of the glass plate 3 for the purpose of holding the same in place from outward movement, the wire 6 serving to hold the glass plate against the support 4, the wire being soldered, or seated in a groove, or otherwise secured in place. The base 2 is removably secured to the cylinder 1 by any suitable means such as the screws 7.

The permanent magnet 8 having poles 9, 9' is supported on the base 2 by studs or supports 10 located under enlarged portions 11 formed on the magnet. Between the pole pieces is located a hollow cylindrical soft iron or steel core 12 for the purpose of providing a good magnetic conductor between the poles of the magnet and for providing two air gaps between the iron core and the poles. In these air gaps is located a metal cylindrical or bell-shaped part 13 of non-magnetic material, and preferably of high electrical conductivity, such as copper. The iron cylinder 12 rests upon one end of a hollow supporting cylinder 14, of non-magnetic material, which cylinder has a flange 15 at its upper end which engages the top portions of the poles 9, 9' of the magnet. Over the lower or inner end of cylinder 14 is fitted a cylindrical cap piece 16 of non-magnetic material, which engages the lower or inner portions of the pole pieces 9, 9'. The hollow screw 17 has a threaded engagement with the end of the iron cylinder 12 and serves to firmly clamp together the core 12 and the two cylinders 14, 16 and to also firmly secure them to the poles of the permanent magnet.

The conducting cylinder 13 which serves to dampen the movement of the movable element is supported at its outer end upon the shaft 18, being clamped in place, as well as the indicator needle 19, between the nuts 20. The shaft is supported at its opposite ends in adjustable bearing screws 21, each of which is supported in a bridging piece 22, lock nuts 23 being provided for locking the bearing screws 21 in any desired adjusted position. The outer bridging piece 22 is supported by posts 24 upon the flange 15 of the cylinder 14; and the inner bridging piece 22 is supported upon the flange 25 of the cap piece 16 by similar posts 24'. The cylinder 14 is larger in diameter than the distance between the pole pieces 9, 9' and the body portion of the cylinder is cut away on opposite sides so as to fit over the poles, thus centering all of the operative parts.

Near the inner end of the shaft 18 is mounted an armature 26 of soft iron or steel, being held in fixed position thereon in any suitable manner. This armature in this instance is elliptical in shape and with a zero indication of the instrument, its longitudinal axis is parallel to a horizontal line extending between the pole pieces as shown in dotted lines in Fig. 1.

In order to create a deflecting field, I provide an exciting or magnetizing coil 27 having an iron core 28. This iron core is shown as a flat plate having its upper end notched and adapted to slide under the head of a rivet 29 fixed to the base 2. A slot 30 is provided near the opposite end of the core 28 and is adapted to receive the screw 31 which has threaded engagement with a post 32 which latter is fixed to the base 2. The core 28 is adjustable longitudinally and sidewise at one end within the coil 27 and is clamped in any desired position by the screw 31. In order to secure a symmetrical arrangement of the coil, two central wires are led from one terminal, which wires divide and separately form turns of the coil as shown in Fig. 1, the outer ends of the coil being brought together and connected to the other terminal. In order to provide room for certain of the parts, the base 2 has a rectangular depressed central portion as shown in Fig. 2 and by full lines and dotted lines in Fig. 1. The terminals of the instrument are shown as comprising bolts 33, to the heads 34 of which are respectively connected the terminals of the coil 27 by a soldered connection or otherwise. The bolts 33 are suitably insulated from the base 2 and held in place thereon by nuts 35.

The scale plate 36 is supported upon the magnet 8 by posts 37. In the form of instrument disclosed, the central position of the needle indicates absence of any current, a deflection to the right indicating flow of current in one direction and a deflection to the left, indicating a flow of current in the opposite direction, this form being particularly adapted for use in the battery circuit in electrical systems for automobiles.

When no current flows through the coil of the instrument, the only magnetic flux created and which affects the movable element of the instrument is that of the permanent magnet 8, which gives a strong magnetic field across the air gaps between the poles and the iron cylinder 12, but also gives a stray field which affects the armature 26 and tends to hold the same with its longitudinal axis parallel with the lines of force existing between the poles 9, 9'. When current passes through the coil 27 of the instrument, it tends to set up a magnetic field substantially at right angles to that created by the permanent magnet, which results in distortion of the magnetic field affecting the armature 26 and which will cause the armature 26 to move to a new position so as to place itself in substantial alinement with the resultant magnetic field and give a corresponding deflection of the indicating needle. It is apparent that the greater the strength of current passing through the coil 27 of the instrument, the greater will be the corresponding deflection of the indicating needle, the maximum deflection of the needle in the form shown being represented as 20 amperes. In this position the armature 26 has shifted from a horizontal position indicated in dotted lines 26 in Fig. 1 to the inclined position as indicated by the dotted lines 26' in Fig. 1. It is apparent that when current flows through the coil 27 in the opposite direction, the resultant magnetic field will cause the armature 26 to rotate in a right-hand direction and shift the indicating needle from the central position to the right to an extent depending upon the strength of the current passing through the coil 27. For calibrating the instrument the iron core 28 is adjustable longitudinally as above described, so as to obtain the proper value of deflecting or cross magnetizing field with the proper values of current passing through the coil of the instrument. The slot or opening 30 through which the screw 31 passes is also sufficiently wide to permit some sidewise movement of the lower end of the core 28. This sidewise adjustment provides means for adjustment of the zero position of the needle, the shifting of the end of the core 28 affecting the distribution of the magnetic field in the neighborhood of the armature 26 sufficiently for obtaining adjustment for a zero position.

It will be noted that in the form of construction described, the armature 26 is subjected to the stray field only of the permanent magnet, whereas the cylinder 13 is subjected directly to the strong magnetic field in the air gaps between the pole pieces of the magnet and the iron core 12, and consequently is subjected to the major portion of the magnetic field created by the permanent magnet. The strong field to which the cylinder 13 is subjected and the high electrical conductivity of the cylinder 13 results in a very strong dampening action upon the movable element, by reason of the strong eddy currents induced. This action is so effective as to cause the movable element to be exceedingly steady in its indications under all conditions and even when used on automobiles where it is continually subjected to shocks and jars.

It is evident that my improved form of construction eliminates the necessity of a number of delicate parts such as the movably mounted coil and springs for restraining the movable element and likewise by its simplicity and rugged construction serves to give durability in use. It is also compact and readily accessible by removing the base 2 from the casing, all parts being supported from this base. The instrument is also readily calibrated and gives a high degree of accuracy.

Although I have described an instrument as adapted particularly for the measuring of a current, it will be understood that my improved construction may also be utilized in instruments adapted for measurement of voltage.

It will also be understood that various modifications in the form of construction may be made from the particular construction above described, without departing from the scope of the invention.

Having thus described my invention, what I declare as new and desire to secure by Letters Patent of the United States is:—

An electrical instrument comprising a permanent magnet, an iron core between the poles of said magnet, a cylindrical dampening element between said core and the poles of said magnet, a shaft supporting said element and passing through said core, a stationary winding, an armature carried by said shaft and affected by the field of said magnet and of said winding, and means clamping the poles of said magnet for supporting said core and said shaft.

In testimony whereof I affix my signature in presence of two witnesses.

FRANK W. ROLLER.

Witnesses:
L. K. SAGER,
M. D. ISUL.